United States Patent
Alper (10) Patent No.: US 7,264,722 B2
(45) Date of Patent: *Sep. 4, 2007

(54) FILTRATION SYSTEM

(75) Inventor: Hal Alper, Flowery Branch, GA (US)

(73) Assignee: Mycelx Technologies Corporation, Gainesville, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/181,372

(22) Filed: Jul. 14, 2005

(65) Prior Publication Data

US 2006/0011551 A1  Jan. 19, 2006

Related U.S. Application Data

(63) Continuation-in-part of application No. 11/179,051, filed on Jul. 11, 2005, now abandoned.

(60) Provisional application No. 60/588,142, filed on Jul. 15, 2004, provisional application No. 60/588,141, filed on Jul. 15, 2004, provisional application No. 60/587,773, filed on Jul. 14, 2004.

(51) Int. Cl.
*B01D 29/07* (2006.01)

(52) U.S. Cl. ............... 210/315; 210/323.2; 210/494.1; 210/497.1

(58) Field of Classification Search ............... 210/315, 210/494.1, 497.1
See application file for complete search history.

(56) References Cited

U.S. PATENT DOCUMENTS

| | | | |
|---|---|---|---|
| 5,122,270 A * | 6/1992 | Ruger et al. | 210/282 |
| 5,437,793 A | 8/1995 | Alper | |
| 5,698,139 A | 12/1997 | Alper | |
| 5,746,925 A | 5/1998 | Alper | |
| 5,837,146 A | 11/1998 | Alper | |
| 5,919,944 A * | 7/1999 | Eldin | 548/453 |
| 5,961,823 A | 10/1999 | Alper | |
| 6,180,010 B1 * | 1/2001 | Alper | 210/680 |
| 6,337,016 B1 | 1/2002 | Alper | |
| 6,475,393 B2 | 11/2002 | Alper | |
| 6,491,822 B2 | 12/2002 | Alper | |

* cited by examiner

*Primary Examiner*—Peter A. Hruskoci
(74) *Attorney, Agent, or Firm*—Klauber & Jackson L.L.C.

(57) ABSTRACT

A method and apparatus for removing organic contaminants from an aqueous phase in which the contaminant is solubilized. In the method the aqueous phase is passed through a fluid-pervious filtration media which has been infused with an absorbtion composition comprising a homogeneous thermal reaction product of an oil component selected from the group consisting of glycerides, fatty acids, alkenes, and alkynes, and a methacrylate or acrylate polymer component. The absorbtion composition is cured in situ at the filter. The contaminant is immobilized at the media, and the purified filtrate having passed through the filtration media is collected as the product. The said oil component comprises at least 95% by weight of the combined oil and polymer components.

5 Claims, 3 Drawing Sheets

FILTRATION SYSTEM

RELATED APPLICATIONS

This application claims priority from U.S. Provisional Applications Ser. Nos. 60/588,142, filed Jul. 15, 2004; 60/587,773, filed Jul. 14, 2004; and 60/588,141 filed Jul. 15, 2004, and is a continuation-in-part of U.S. Nonprovisional application Ser. No. 11/179,051, filed Jul. 11, 2005 now abandoned.

FIELD OF INVENTION

This invention relates generally to apparatus and methods for removing contaminants from aqueous systems, and more specifically relates to filtration devices and methods for removing slightly soluble and/or emulsified organic compounds (such as an oil-in-water emulsions) from such aqueous systems.

BACKGROUND OF INVENTION

In recent years many previously clean water sources have been found to be contaminated with dispersed oils which are often present as oil-in-water emulsions. A further source of contamination arises from presence in the water of pernicious slightly soluble organic compounds such as benzene, toluene, xylene, halogenated hydrocarbons, ethoxylated glycols, etc. These noxious contaminants are among the more difficult compounds to remove from water, and indeed most are carcinogenic. In the present inventor's U.S. Pat. No. 6,180,010 it is disclosed that the compositions described in the inventor's U.S. Pat. Nos. 5,437,793; 5,698,139; and 5,837,146, and 5,961,823 (all of which disclosures are hereby incorporated by reference) have extremely strong affinities for the aforementioned contaminants in water; and that when aqueous streams containing these noxious contaminants are passed through filtration media incorporating these compositions, the contaminants are immobilized at the media, as a result of which concentration levels of the contaminants in the filtrate may be reduced to very low values.

Filter configurations incorporating the said compositions may be based on various water permeable substrates, such as shredded, spun or otherwise configured polypropylene or shredded or spun cellulose, which substrates are infused or otherwise treated with the absorbent compositions, which are then cured. These substrates may be packed or otherwise disposed in a cartridge or canister filter; or can be formed into cured and infused bag filters which can be emplaced in canisters through which the contaminated water is flowed. Similarly the said compositions can be incorporated into or upon other filtering substrates and media, such as paper, including compressed pulp materials, particulate porous foamed plastics, mineral particulates such as perlite and vermiculite, and particulate, fibrous or porous ceramic or porous (e.g. sintered) metal substrates and media.

In a first copending provisional patent application of the present inventor, a further filtration medium and method for its preparation is disclosed which while incorporating certain components of the absorbent compositions of my prior patents, has unexpectedly been found to have markedly superior properties when used as such an absorbent composition in the filtration of organic contaminants from aqueous systems, as for example in removing oils from an oil-in-water emulsion. These further compositions are prepared in part from the absorbent compositions of my prior art patents, which as disclosed in the patents are the reaction product of an oil component and a methacrylate or acrylate polymer component. The absorbent compositions disclosed in the aforementioned copending provisional application are prepared by further combining such prior art reaction product (herein called "reaction product A") with a photoinitiator system before infusing the combination into the fluid-pervious filtration media. Subsequent exposure of the infused filtration media to actinic UV radiation, effects a very rapid in situ curing of the infused composition, and results in a filter having markedly improved filtration characteristics. Although applicant is not bound by any specific theory, it is hypothesized that the UV in situ curing may result in extensive additional cross-linking of the infused absorbent, with consequent hardening of the infused composition, and pore sizes in the filtration media may in consequence be much smaller than in the filters of my prior methodology. Regardless of the precise mechanism involved, filters so prepared exhibit higher back pressure in use, with consequent increased dwell time for the aqueous streams being passed through the filter. The filters are among other things found to be much more efficient in breaking oil-in-water emulsions than filters prepared by the inventor's prior methodology and compositions. For this reason, and for convenience, such filters shall be referred to herein as "EB" filters, and the corresponding infusion compositions shall at times be referred to as "EB" absorbent compositions. In contrast the filters prepared by the inventor's prior patented methodology and compositions shall, again for purposes of convenience, be referred to as "PA" filters and "PA" absorbent compositions.

In the general method for preparing an EB filter in accordance with the disclosure of said first copending provisional application, a homogeneous thermal "reaction product A" is initially prepared from an oil component and a polymer component, as in my earlier cited patents. The thermal reaction product A here is preferably prepared in a temperature range of 350° to 550° F., and more preferably at a range of from about 400 to 500 deg. F. A photoinitiator system is separately prepared from a monomer cross-linking agent, a catalyst, and a wetting agent, i.e. an oligomer/adhesion promoter/cross-linking agent. An infusing solution is then prepared by combining the reaction product A and the photoinitiator system together with a solvent such as acetone. This solution is infused into the filtration media, e.g. a conventional filtration cartridge containing a filtration substrate such as fibrous polypropylene. The infused cartridge or other infused substrate is then exposed to UV radiation for a short period, usually of the order of several minutes to effect the desired curing. The EB filter is then ready for use.

In accordance with one aspect of the invention disclosed in a further copending provisional patent application of the present inventor, a filtration apparatus is provided for separating organic contaminants from an aqueous phase in which the contaminant is solubilized or emulsified. The apparatus includes a canister having an inlet and an outlet for passing the liquid phase therethrough. A fluid-pervious composite filtration media is provided at the interior of the canister in the flow path of the liquid phase proceeding between the inlet and outlet. The contaminant(s) in the liquid phase flowing through the canister come into intimate contact with and are immobilized at the media. The composite media is preferably in the form of a cartridge which is replaceably mounted in the canister The cartridge composite filtration media comprises a central core which is surrounded and wrapped by a plurality of overlying sheets of further fluid pervious filtration media, the overlying sheets creating void spaces therebetween for trapping and immobilizing at least some of the separated contaminants. The composite filtration media is infused with an absorbtion composition comprising a homogeneous thermal reaction product of an oil component selected from the group consisting of glycerides, fatty acids, alkenes, and alkynes, with a methacrylate or acrylate polymer component. The thermal reaction product here is preferably prepared in a temperature range of 350 to 550 F., and more preferably at a range of from about 400 to 500 deg. F. The absorption composition is cured in situ at the composite filtration media, which can be facilitated by exposure to actinic radiation.

The wrapping of the core in the manner indicated affects the rapidity and degree of curing so that the polymeric compositions infused at the outer portions of the composite filter are at a more advanced stage of cross-linking then progressively inward lying portions. This is due to higher oxygen exclusion at the wrapped inner core (and inside sheets of the wrap), and where actinic radiation is used in curing, to increased blocking of the radiation at inward portions of the composite filter.

Preferably the flow of the aqueous phase through the canister is in such direction that the flow proceeds from the outside of the cartridge to the inside or axis. The central core and the wrapped portions of the composite cartridge can comprise different substrate materials and the two said portions of the cartridge can be infused with differing absorbtion compositions. Also the number of overlying layers wrapping the core can differ depending upon the desired application for the apparatus.

The filtration media of the central core can comprise various substrates such as 5 micron/1 micron/meltdown polypropylene, reticulated polypropylene etc. The wrapped sheets may comprise Spun bond poly propylene sheets, or other porous sheet materials such as non woven fabrics (cellulosic, glass fibers, spun bond polypropylene, Nylon, polyamide etc.); and/or woven fabrics such as burlap, cellulosics and other natural fibers. For convenience the composite filters and cartridges described shall be referred to by the designation "WR", which is suggestive of the wrapped sheets which surround and enclose the central core of the filtration media. It will also be clear that the principles of the invention just explained can be applied in other filter geometries, such as those employing rectangular or spherical geometries.

SUMMARY OF INVENTION

In accordance with the present invention, it has been found that in many applications the absorbent compositions of my aforementioned patents are improved by a drastic increase in the ratio of oil component to polymer component. Typically for example the oil component may be increased to above 95% and preferably to around 98% by weight of the two components. These higher oil blends appear to have higher affinity for the more soluble organic compounds such as benzene and low molecular weight chlorinated solvents. Also here the thermal reaction product of oil and polymer component is preferably prepared at a temperature range of 350 to 550 F., and more preferably at a range of from about 400 to 500 deg. F. The filtration media that result after infusion, as well as the infusing compositions, shall be referred to herein by the designation "HO", which is suggestive of the high content of the oil component The term "absorbent composition" will be used herein as one of convenience for identifying the said compositions of my aforementioned patents, and will be used as well in referring to the additional compositions disclosed in my cited copending provisional patent applications. The specific mechanism by which the noxious contaminants are removed from aqueous streams by conjunctive use of such "absorbent compositions" is not completely understood, and could include attachment and/or fixation of such contaminants by mechanisms which technically involve various physical and/or chemical interactions. The term "absorbent" as used herein is intended to encompass all of these possible mechanisms.

DESCRIPTION OF PREFERRED EMBODIMENTS

Figure 1:
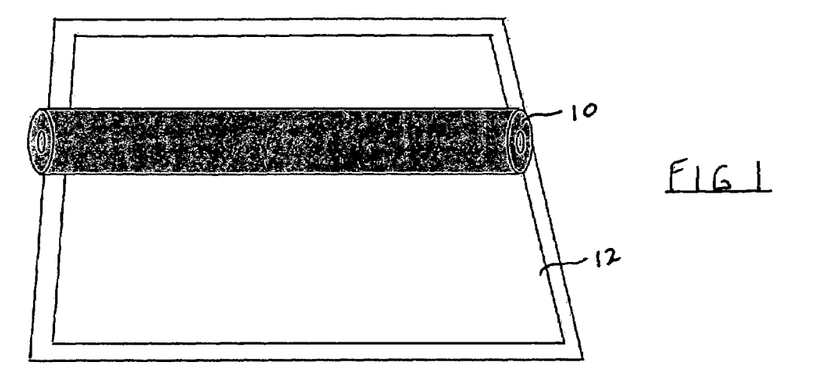
FIGS. 1 through 4 schematically depicts preparation of a representative WR filter which can be used with the present invention.
Figure 2:
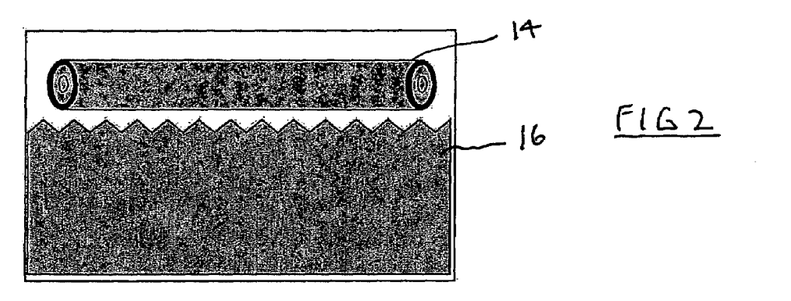
Figure 3:
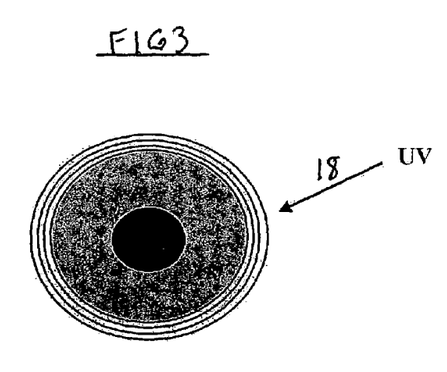
Figure 4:
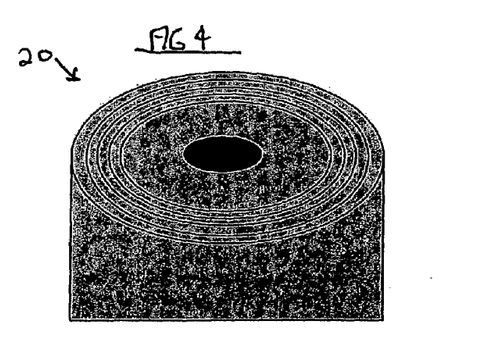
Figure 5:
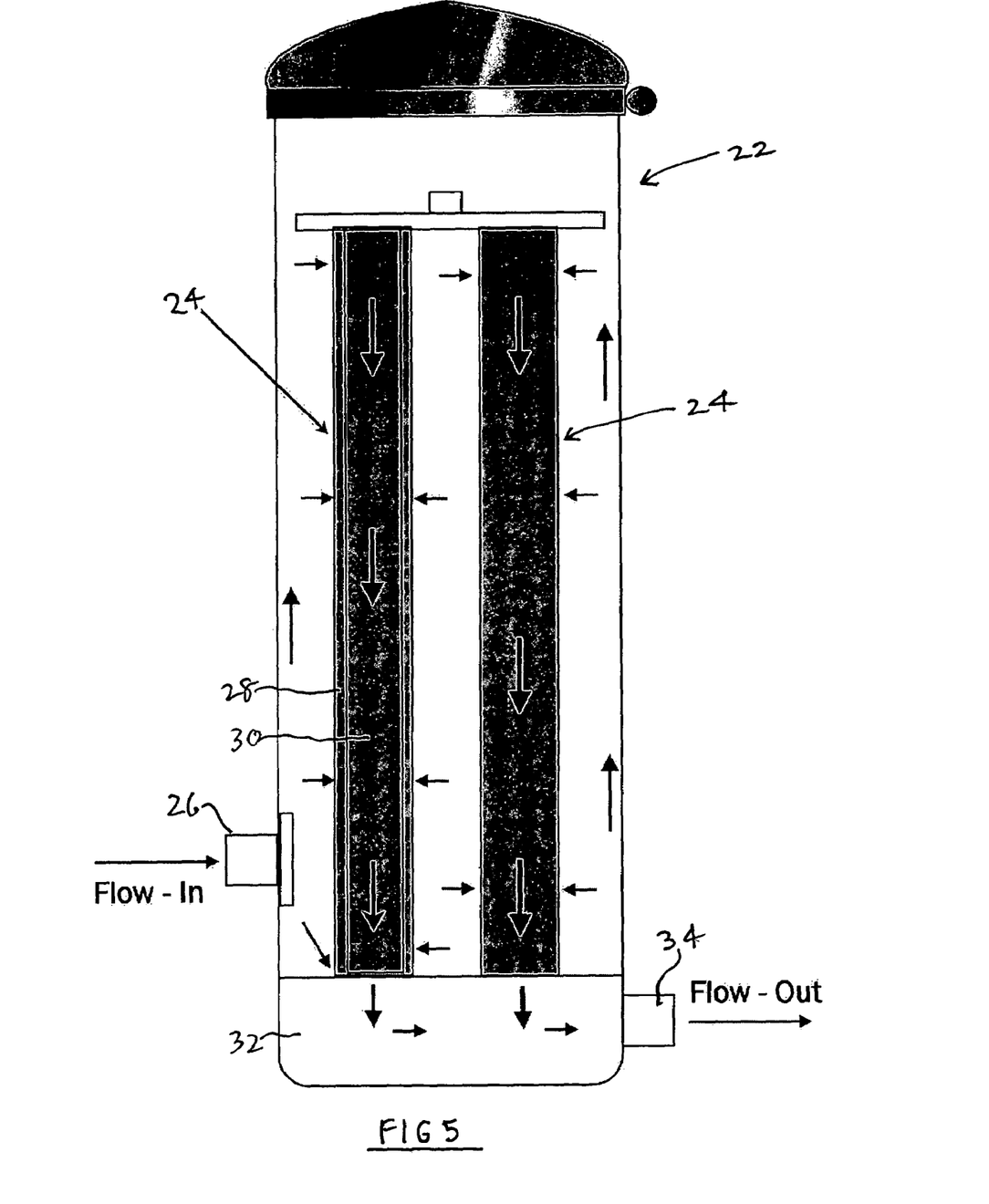
FIG. 5 is a schematic diagram of a filtration canister containing a pair of WR filters.

The present invention can be used with various filter constructions including the aforementioned WR type of filters. A typical WR filter can be prepared as shown in FIGS. 1 through 4. A 5 micron core filter 10 is wrapped in multiple layers of 1 oz. per square foot melt blown sheet material 12 and affixed using tie wraps. The composite filter is then infused with a solution of the absorbent composition 16. UV light 18 is used for curing in FIG. 3. Less UV light penetrates to the core resulting in differential tackiness through the sheets. The finished differential viscosity gradient filter 20 is seen in FIG. 4. The viscosity gradient enhances coalescence. FIG. 5 shows a filtration canister 22 in which a pair of WR filter cartridges 24, as in FIG. 4, function in parallel. The system to be filtered enters via port input 26. The flow to each filter cartridge 24 proceeds from the outer sheets 28 toward the core 30, and then exits axially into a discharge reservoir and outflow 34.

The wrapping of the core in the manner indicated affects the rapidity and degree of curing so that the polymeric compositions infused at the outer portions of the composite filter are at a more advanced stage of cross-linking then progressively inward lying portions. This is due to higher oxygen exclusion at the wrapped inner core (and inside sheets of the wrap), and where actinic radiation is used, to increased blocking of the radiation at inward portions of the composite filter.

Filter constructions utilizing the principles of the present invention can be based upon canisters or drums which are internally packed with composite or relatively uniform filtration media comprising substrates such as mentioned above, which have been infused with or otherwise carry absorbent compositions in accordance with the invention, and wherein the infused materials are processed in accordance with the invention. Since the PA absorbent compositions of my cited earlier patents can serve as the "reaction product A" as used in preparing the portions of the filtration media used in the present invention where such media is of the composite WR type, it is appropriate here to describe these prior art aborbents in some detail.

The PA absorbent composition thus disclosed in the first of my aforementioned patents, i.e. U.S. Pat. No. 5,437,793, is characterized therein as a coagulant product which comprises a glyceride such as linseed oil reacted with a polymer such as poly (isobutyl methacrylate) which is then diluted with a solvent, such as 2,2,4-trimethyl-1,3-pentanediol monoisobutyrate. The composition formed by the thermal reaction of the linseed oil with the isobutyl methacrylate polymer is a soft resinous product which, when diluted with a solvent, results in a mixture that in the teaching of the said patent can be sprayed onto an oil spill or otherwise introduced to the oil spill to coagulate the oil. Additionally, however, and as disclosed in my further U.S. Pat. No. 5,698,139 patent and additional patents cited, further experimentation led to the discovery of additional absorbent compositions produced from polymers and a variety of natural animal and vegetable oils, fatty acids, alkenes and alkynes, which absorbent compositions are all utilizable in preparing the filters of the present invention. More generally these latter compositions are the thermal reaction product of a polymer component with an oil component selected from the group consisting of glycerides, fatty acids, alkenes and alkynes. The reaction conditions can be adjusted to provide a "first endpoint" product or a "second endpoint" product. Preferred compositions are disclosed which comprise the thermal reaction products of methacrylate polymers with a glyceride derived from a variety of natural animal and vegetable oils, or the thermal reaction products of methacrylate polymers with a fatty acid or alkene or alkyne containing from about 8-24 carbon atoms. The combination of a methacrylate polymer component with any of these oil components can provide either a first or second endpoint product, depending upon the reaction conditions. The term "first endpoint product" is used to describe the solubility product of the reaction which is a cooperative structure held together by many reinforcing, noncovalent interactions, including Van Der Waals attractive forces. The term "second endpoint product" is used to describe the product of the reaction which is the result of covalent bond formation between the polymer component and the oil component, as indicated by the change in molecular weight.

In a preferred embodiment, the prior art product is synthesized from an isobutyl methacrylate polymer, and the oil component is one derived from a natural oil, such as linseed oil or sunflower oil. Optionally, the composition is then diluted with a solvent, such as 2,2,4-trimethyl-1,3-pentanediol monoisobutyrate or acetone. The diluted composition can then be applied to a desired substrate for use as a filtration media.

The polymer component of the said PA absorbent composition is a synthetic polymer such as polymers derived from methacrylates. Preferably, the polymer is derived from methyl methacrylate, ethyl methacrylate, isobutyl methacrylate, or n-butyl methacrylate, or may be a copolymer containing a methacrylate polymer. Most preferably, the polymer is a poly(isobutyl methacrylate) polymer such as that obtainable from ICI Acrylics as ELVACITE® 2045, or a methacrylate/methacrylic acid copolymer such as ELVACITE® 2008 or 2043.

The test used to determine whether or not a polymer can be used in preparing the prior absorbent compositions is to combine the polymer component in question with the oil component, to see if the resultant combination forms a homogenous product after heating. It is stated in the patent disclosures that the polymer component percentage of the composition should range from about 15-75%, preferably 20-40%, or more preferably from about 25-35%, by weight.

In one embodiment of the PA absorbent composition, the oil component of the composition is a glyceride derived from oils of vegetable or animal origin. Vegetable oils are obtained by cold pressing the seeds of a plant to obtain the oil contained therein. Of the vegetable oils, drying oils such as sunflower, tung, linseed, and the like; and semi-drying oils, such as soybean and cottonseed oil, have been shown to be useful as the glyceride component. Animal oils, such as, for example, fish oil, tallow and lard can also be used as a glyceride component of the composition. It is anticipated that any drying oil or semi-drying oil will work in the composition. Generally, a drying oil is defined as a spreadable liquid that will react with oxygen to form a comparatively dry film. Optionally, combinations of two or more glycerides can be used as reactants with the polymer to provide useful absorbent compositions.

A glyceride derived from a drying oil, such as linseed oil, can be obtained from Cargill, Inc. as Supreme Linseed Oil, or sunflower oil. The glyceride should comprise from about 25-85%, preferably about 60-80%, and most preferably, from about 65-75% of the coagulant composition. All percentages in this disclosure are by weight, unless otherwise stated.

Where the oil component of the PA composition is a fatty acid or alkene or alkyne utilized as the reactant with the polymer, it contains from about 8 to 24 carbon atoms, and preferably from about 10 to 22 carbon atoms. Such fatty acids, alkenes and alkynes are commercially available from many suppliers. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Typical alkenes and alkynes contain at least one and preferably one or two degrees of unsaturation, and from about 8 to 24 carbon atoms, with 10-20 carbon atoms being preferred. Preferred alkenes and alkynes are those such as 1-decene, trans-5-decene, trans-7-tetradecene, 1,13-tetradecadiene, 1-tetradecene, 1-decyne, and 5,7-dodecadiyne.

The said PA absorbent composition is a product with characteristics different from either of the starting materials or a simple mixture of the two starting materials, thus showing that a new composition is produced by the thermal reaction. Specifically, the oil/polymer absorbent compositions pass a clear pill test after being heated at the elevated temperatures and do not separate into two parts upon being cooled but, rather form a homogenous, uniphase compound.

The solvent can be selected from aliphatic hydrocarbons, aromatic hydrocarbons, alcohols, ketones, ethers, aldehydes, phenols, carboxylic acids, synthetic chemicals and naturally occurring substances.

The said PA absorbent composition used is prepared by a thermal reaction process. The first step of the process involves heating the oil component (glyceride or fatty acid or alkene or alkyne) to approximately 235-350° F. at a rate of about 5° F. per minute with continuous stirring. Then, the polymer component, usually in powdered form, is slowly stirred into the heated oil component. Depending upon the particular reactants used, the oil component is stated to range from about 25-85%, preferably about 65-80%, more preferably about 72-77%, and the polymer should range from about 1-50%, preferably about 20-40%, more preferably about 23-28%, of the coagulant composition. After this mixture has been mixed properly, the mixture should be heated to approximately 400-700° F., depending on the particular components utilized for the reaction, and the desired endpoint of the reaction. Typically, reaction temperatures below about 500° F. produce "first endpoint products" while temperatures above about 500° F. produce "second endpoint products"

The mixture should be heated at that temperature until a clear pill test indicates that the reaction has reached its first end point, i.e., a drop of the reaction mixture when placed on a clear glass plate is clear. When a clear pill test indicates that the reaction has reached its first end-point, the mixture should be cooled to a temperature below 200° F., generally about 180° F. After cooling, the coagulant product can be diluted with a suitable solvent to form a more liquid product that is easier to handle and use. The temperature at which the solvent is added is not critical, but the solvent should be added at a temperature where the coagulant composition is still pliable and the solvent will not rapidly evaporate.

Two reactions appear to occur between the oil component and the polymer component based upon the temperature and time. The first endpoint of the reaction results in a rubbery viscoelastic, relatively soft product with a melting point in the range of 100° F. to 250° F. This first endpoint product is homogeneous and does not separate upon melting or dissolution. This reaction occurs at 350° F.-500° F. This is designated the "first endpoint product" (solubility product).

In the second reaction, the polymer undergoes complete or partial chain fission into discrete polymer free radicals at a temperature above about 500° F. At between 350° F. to 500° F., it is believed that partial chain fission of the polymer component (isobutylmethacrylate polymer has a m.w.=300,000 Daltons) occurs at the end of the chain or in the middle. This results in a lower molecular weight product. It is believed that there may also be a solubility reaction occurring (similar to Sn and Pb forming solder) within the ternary composition. The occurrence of a chemical reaction is confirmed, however, due to the change of molecular weight.

Reactions at above 500° F. and up to 900° F. maintained at temperature from 5 minutes to 20 hours, depending on activation energy of compositions, result in the second endpoint product. This reaction is visually observable by color, rheology, and specific heat change in the product [Note: For the first endpoint product the end of the reaction is observed by change in color and a rheology change and the cessation of solution outgassing. There is also a change in specific heat as measured by Differential Scanning Calorimetry]. The second endpoint product has a weight average molecular weight in the range of about 62,000 Daltons which is consistent with complete chain fission of the polymer, resulting in smaller free radicals which results in a lower molecular weight compound. The melting point of these products is usually above 300° F. if the oil component is highly unsaturated, which results in a solid product due to the formation of highly bonded three dimensional densely packed molecular matrix. If the oil component has a low degree of unsaturation, the resultant product is usually liquid, which is consistent with this type of reaction.

The oily component and the polymer component are reacted in a thermal reaction that does not appear to be sensitive to the atmosphere under which the reaction is carried out, i.e., whether it is an inert, oxidizing or reducing atmosphere. Absorbent compositions have been prepared by this reaction which range from soft to hard, and elastomeric to brittle in nature depending upon the ratio of the oil component to the polymer component and the choice of the polymer component and/or the oil component used. If the reaction mixture separates into two phases upon cooling it is not useful for the invention. In this manner, any polymer can be identified for use in the invention.

The mechanism of the thermal reaction remains to be elucidated. While not wishing to be bound by any theory in this regard the reaction appears to be a polymerization or phase transition reaction brought about by heat and which is stable at lower temperatures. It is hypothesized that the elevated temperatures create monomer free radicals of the polymers and copolymers which then crosslink with the unsaturated glyceride molecules. It is also hypothesized that perhaps a phase transition is occurring between the oil component and the polymer component. In an effort to determine what type of interaction or reaction is occurring between the oil component and the polymer component, thermal analysis of several of the absorbent compositions was conducted. The results indicate that a reaction is occurring between the oil component and the polymer.

Differential scanning calorimetry (DSC) was thus performed on several such compositions. DSC is a thermal analysis technique that measure the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated the typical DSC readout.

Samples were taken at the beginning of the reaction procedure described earlier and at the end of the reaction. The DSC profile for the initial starting materials is dramatically different from the profile of the product. The initial profile showed two exothermic events when the DSC analysis is carried out from 40-280° C., one event occurring at about 100° C. and the other at about 217° C. In the DSC profile of the reaction product, however, there was only one exothermic event, occurring at about 261° C. The samples were taken at initial and final points during the reaction and allowed to cool to room temperature before being subjected to the DSC.

In the instance of a further reaction, DSC's of the starting materials and final product were obtained. Again, the DSC curves generated show that two thermal events occurred for the "just mixed" reactants while only one thermal event occurred for the final product. Thus, the DSCs indicated that the occurrence of a reaction or phase transformation. Similar evidence obtained from IR spectra analysis also confirms that the absorbent compositions used in the invention are distinct products from the reactants used to prepare the absorbent compositions.

Preparation of the additional EB absorbtion composition of my cited copending provisional patent application is illustrated by the following:

In the first step a reaction product A of oil component and polymer is prepared as follows:

Synthesis of "Reaction Product A":

378 g of linseed oil and 4 g of tung oil were added to a 5 liter beaker (1). The oil was mixed using a stirrer. Add 169 g of poly(isobutyl methacrylate) were added to the oil. The contents was heated to 425-450 F. while keeping the contents mixed. The resultant polymer was cooled down to about 100 F.

Preparation of Photoinitiator Mix:

85 g of HDODA (1,6 hexane diol diacrylate, monomer/crosslinking agent of UCB Specialities, Inc.) and 50 gms of Darocure 1173 (2-hydroxy-2-methyl-1-phenyl-propanone photoinitiator catalyst of Ciba Specialty Chemicals) were added to 510 g of CN111 (a difunctional epoxidized soybean oil acrylate oligomer/adhesion promoter/wetting agent product of Sartomer Company) in a 5 liter beaker (2). 1800 ml of acetone were added to the mix and the mix was stirred to dissolve the contents homogenously.

Preparation of Infusion Solution

The contents of beaker (2) was added to beaker (1) and the contents were wellmixed using a stirrer to create a homogenous solution of 40% active components and 60% acetone solvent.

Preparation of Filter Cartridges:

A 10" Spunbond PP ((polypropylene product of Osmonics) was dipped in beaker (1) for 4 seconds. The filter was removed and drained of the excess solution for 2-3 min. The cartridge was then exposed to 360 nm wavelength D type UV lamps. The final curing of the cartridges is represented by the optimal weight increase due to crosslinking of the photoinitiator (Darocure 1173) with the monomer (HDODA, CN 111) and reaction product A. The rate of curing depends on the intensity of UV lamps used. E.g. using 600 W/sq inch intensity UV lamp @ 360 nm, curing time=5 min. Using 1 W/sq inch intensity UV lamp @ 360 nm, curing time=5 days.

The present invention is further illustrated by the following Examples, which are indeed to be considered as merely exemplary and not delimitative of the invention otherwise described. Examples 1 to 6 are illustrative of the WR and EB cartridges, and provide bases for comparative performance for the HO compositions and filters employed in the remaining Examples.

EXAMPLE 1

A cylindrical WR cartridge with EB infusion solution was prepared as follows:

Materials Used:

Filter cartridge: 1 micron Spun Bond Polypropylene or Reticulated Polypropylene cartridges. Dimension: 30" ht×2.5" diameter;

Size of Nonwoven polypropylene filter material/cloth. 30" ht×94" wide

The EB "infusion solution" described in the foregoing for preparing an EB filtration media as in my copending provisional patent application.

Procedure:

1. The polypropylene filter cloth was wrapped around the polypropylene cartridge so that the number of layers of cloth around the cartridge was 12.
2. The cloth around the cartridge was clamped using plastic ties to hold the cloth in place.
3. In further steps "A" refers to the wrapped around cartridge as obtained by 2.
4. "A" was infused by dipping it in the EB infusion solution for 4-6 seconds.
5. "A" was removed from the dipping container and excess solution drained back into the dipping container
6. The "dipped A" was exposed to the UV lamps. The UV lamps used: were 1 W/in2 intensity @310-390 nm wavelength. T curing time depends on the light intensity. In the present Example 5 days under the UV lamps was used.

EXAMPLE 2

The same procedure used in Example 1 was followed to produce a further composite cartridge, except that the infusion solution used was the PA infusion solution used in my prior patents, notably the "reaction product A" in a solvent. The curing procedure was identical to that in Example 1.

EXAMPLE 3

Performance Testing on Composite Cartridges

In this Example the performance of the composite media filters of Examples 1 and 2 were compared to that of prior art filters. The prior art filters differed from those of Example 1 and 2 primarily in that the filtration media of the cartridges ("control cartridges") was not the wrapped composite, but rather a conventional cartridge commercially available from Perry Equipment Corporation. Compared composite and control cartridges were infused with the same solutions, and identically cured etc.

Cartridge (a): The weight of 10" control PA cartridge infused with PA solution of my prior patents: 160 g (10" ht×2.5" dia)

Cartridge (b): The weight of 10" WR composite cartridge infused with PA solution of my prior patents: 235 g (10" ht×2.7" dia)

Cartridge (c): The weight of 10" control PA cartridges infused with EB solution of my provisional application: 275 g. (10" ht×2.5" dia)

Cartridge (d): The wt. of 10" composite WR cartridges infused with EB solution of my provisional application: 345 g. (10" ht×2.7" dia)

Surface Area of (a) and (c) Cartridges:
2×3.14×(1.25−0.5)=4.71 in2

Surface Area of (b) and (d) Cartridges:
2×3.14×(1.35−0.5)=5.34 in2

At a Flow Rate of 0.16 Gpm/in2 Surface Area of the Cartridge on IMO Test Emulsion Fluid C IMO Emulsion Test Fluid C:

Residual fuel oil: Specific gravity: >0.87

Distillate fuel oil: Specific gravity: 0.82-0.87

Surfactant: Sodium dodecyl benzene sulfonate

Particulates: Iron oxide: 0-10 micron 3000 ppm of the oil in water emulsion is prepared using the above components and performance of 2 cartridges in series systems are tested.

On 10" (c) Cartridges: Oil Holding capacity to 5 ppm breakthrough: 10 g

On 10" (d) Cartridges: Oil holding capacity to 5 ppm breakthrough: 35 g

Ratio of increase in oil holding capacity of (d) cartridges to (c) cartridges=35/10=3.5

Dry wt. of 2−(c) cartridges=2×275=550 g

Dry wt. of 2−10" (d) cartridges=2×345=690 g

Ratio of increase in wt of (d) cartridges to (c) cartridges=690/550=1.25

EXAMPLE 4

In this Example the oil holding capacity of the composite WR media filter of Example 2 was compared to that for a prior art PA filter. The prior art filter differed from that of Example 2 only in that the filtration media of the PA cartridge ("control cartridge") was not the WR wrapped composite, but rather a conventional PA cartridge commercially available (prior to its infusion) from Perry Equipment Corporation. This is to say that both cartridges were infused with the same PA solution as in Example 2, and identically cured etc.

At a flow rate of 0.22 Gpm/in2 surface area of the cartridges, 3000 ppm of non emulsified No. 2 oil (Specific gravity 0.85-0.92) in water was made and performance of the control cartridge and Example 2 ("composite") cartridge were compared.

On 10" control cartridges: oil holding capacity to 5 ppm breakthrough: 85 grams

On 10" Example 2 composite cartridges: oil holding capacity to 5 ppm breakthrough: 185 grams Ratio of increase in oil holding capacity of WR composite to control PA cartridge=185/75=2.46

The weight of 10" PA control cartridge: 160 grams (10" ht×2.5" dia)

The weight of 10" Example 2 WR cartridge: 235 grams (10" ht×2.7" dia)

Ratio of increase in weight of composite WR cartridge to PA control cartridge=690/550=1.25

EXAMPLE 5

Performance of the Example 3 Cartridges

| Filtration media of infused Cartridge | Oil Holding capacity of cartrididge (b) of Example 3 (grams) | No. of infused Polypropylene sheets | Oil holding capacity of cartridge (d) of Example 3 (grams) |
|---|---|---|---|
| 5 micron reticulated | 135 | 1 | 145 |
|  | 135 | 4 | 185 |
|  | 135 | 10 | 300 |
| 5 micron melt blown | 70 | 1 | 85 |
|  | 70 | 4 | 120 |
|  | 70 | 10 | 240 |
| 1 micron melt blown | 85 | 1 | 95 |
|  | 85 | 10 | 275 |

EXAMPLE 6

Figure 6:
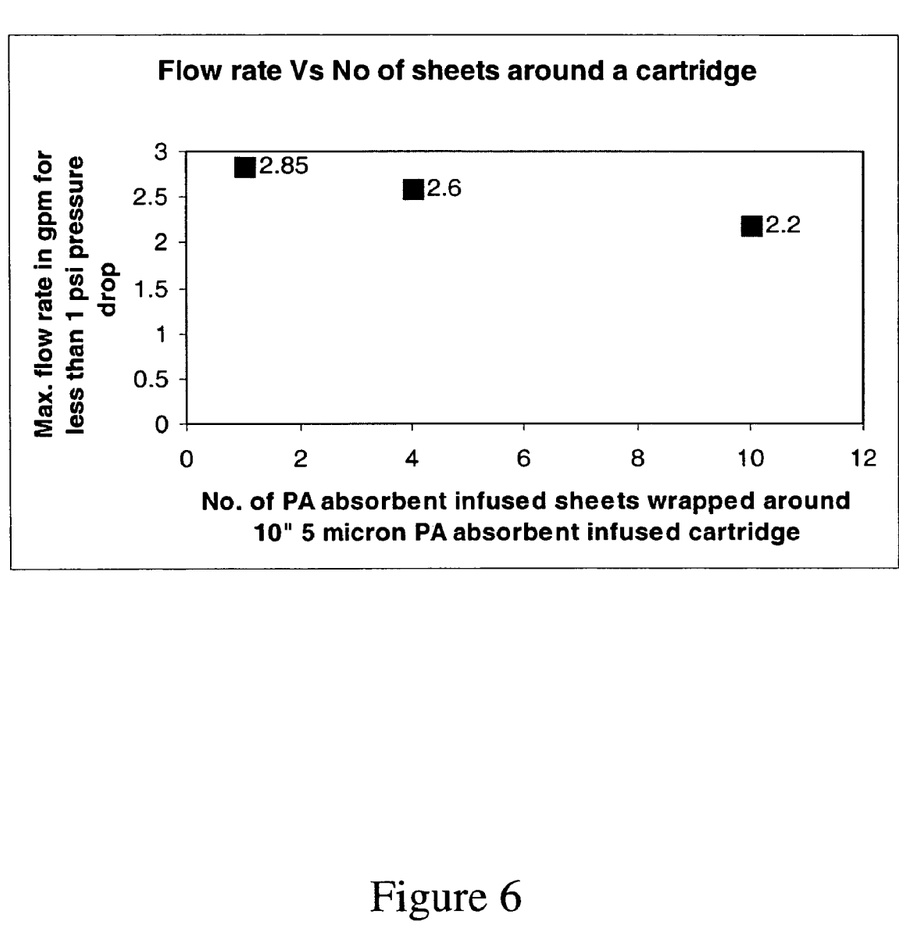
FIG. 6 is a graph showing the maximum flow rate in gpm for less than 1 psi pressure drop as a function of the number of sheets wrapped around a WR cartridge, as referred to in Example 6.

In this Example different numbers of PA absorbent infused sheets were wrapped around a 10 inch 5 micron PA absorbent infused cartridge. The appended FIG. 6 shows the maximum flow rate in gpm for less than 1 psi pressure drop as a function of the number of sheets wrapped around the cartridge.

EXAMPLE 7

Preparation of 3000 g or 1 Gallon of HO Infusion Solution

Reaction Product A Synthesis:

Add 2646 grams of linseed oil or other drying/semidrying oils or combination of all or both to 5 liter glass beaker (1). Mix the oil/oils using a stirrer. Add 54 grams of IBMA to the oil. Heat the contents to 425-450 F while keeping the contents mixed. Let the resultant polymer (Reaction product A) cool down to about 100 F.

Making HO Infusion Solution:

Add 300 grams of acetone to contents of beaker (1). Mix the contents with a stirrer to achieve a homogenous solution.

Making HO Cartridges/Substrates:

Dip a 10" Spunbond PP/100 grams of substrate in the beaker (1) for 4 seconds. Take the filter out and drain the excess solution for 2-3 min. The substrates can either be ambient air cured or cured by exposing the cartridge/substrate to 360 nm wavelength UV lamps. The final curing achieved is represented by a dry oily film on the surface of the substrate. The rate of curing depends on the humidity/temperature of ambient air or intensity of radiation used.

For e.g. using ambient air drying/curing at 26RH (Relative Humidity) and 70 F, curing time=7 days

EXAMPLE 8

Performance Testing of HO Substrates/Cartridges

Dry wt. of Permakleen (trademark of Mycelx corporation for an infused shredded mix of polypropylene foam and sheet, plus shredded burlap-within a fabric bag) in a 10" housing: 105 grams Wt. of Permakleen infused and cured with HO absorbent: 270 gms Dry wt. of 10" EB cartridge=345 grams 50 ppm of benzene in water solution is prepared and tested for benzene removal efficiency and capacity on 2 systems at a flow rate of 0.25 Gpm System 1: 10" PA infused Permakleen in a bag followed by 10" EB cartridge in a canister.

System 2: 10" HO infused Permakleen in bag followed by 10" EB cartridge in a canister.

Total dry wt. of system 1=100+345=445 grams

Total dry wt. of system 2=270+345=615 grams

Removal efficiency of system 1: 90%

Capacity of system 1 at 90% removal efficiency for benzene from water: 0.1-0.3 g Removal efficiency of system 1: 95-98%

Capacity of system 1 at 98% removal efficiency for benzene from water: 3-5 g

Ratio of increase in Benzene holding capacity of System 2 to System 1=5/0.3=17

Ratio of increase in dry wt of System 2 to System 1=615/445=1.3

EXAMPLE 9

Re: Capacities/Performance of MYCELX Corporation Bilge Water Cleaning System on IMO Emulsion Systems Compared System 1. Two 1 micron EB cartridge in canister filters in series System 2. Two 1 micron EB infused WR filters in series System 3. One infused Permakleen in bag filter followed in series by 1 micron cartridge in canister EB filter System 4. One HO infused Permakleen in bag filter followed in series by one 1 micron EB infused WR filter Testing Parameters:

Influent: 50-100 ppm of emulsion

Capacities:

System 1:

Initial effluent: 5 ppm

Capacity of system to 15 ppm breakthrough @ 4-5 Gpm: 175 grams

Capacity of system to 15 ppm breakthrough @ 8-9 gpm: 75 grams

System 2:
Initial effluent: 0 ppm
Capacity of system to 15 ppm breakthrough @ 4-5 Gpm: 240 grams
Capacity of system to 15 ppm breakthrough @ 8-9 Gpm: 135 grams System 3:
Initial effluent: 5 ppm
Capacity of system to 15 ppm breakthrough @ 4-5 Gpm: 200 gms
Capacity of system to 15 ppm breakthrough @ 8-9 Gpm: 98 grams System 4:
Initial effluent: 0 ppm
Capacity of system to 15 ppm breakthrough @ 4-5 Gpm: 275 grams
Capacity of system to 15 ppm breakthrough @ 8-9 Gpm: 170 grams All the above data is based on the rigorous IMO emulsion described above.

Although the above tests do not compare HO infused Permakleen bag filter with PA infused Permakleen bag filter, bench scale tests have confirmed the significant improvement of capacity of the former on solvent based emulsions like oil emulsions containing BTEX and chlorinated solvents.

The increased capacity of HO infused Permakleen bag filters versus PA infused Permakleen bag filter is clearly evident at higher flow rate or when the system configuration includes two PA cartridges in canister filters in series following a Permakleen filter unit, which is more likely to be the configuration for the actual IMO Test fluid at 2000-3000 ppm of Influent.

While the present invention has been set forth in terms of specific embodiments thereof, the instant disclosure is such that numerous variations upon the invention are now enabled to those skilled in the art, which variations yet reside within the scope of the present teaching. Accordingly, the invention is to be broadly construed and limited only by the scope and spirit of the claims now appended hereto.

The invention claimed is:

1. A filtration system for separating organic contaminants from an aqueous phase in which the contaminant is solubilized or emulsified, comprising:

a canister or other container having an inlet and an outlet for passing said aqueous phase therethrough;

a fluid-pervious media being provided at the interior of said container in the flow path of the aqueous phase proceeding between said inlet and outlet, said media being infused with an absorbent composition comprising a homogeneous thermal reaction product of an oil component selected from the group consisting of glycerides, fatty acids, alkenes, and alkynes, with a methacrylate or acrylate polymer component; said oil component comprising at least 95% by weight of the combined oil and polymer components;

said absorbent composition being cured in situ at the media; said contaminants in the aqueous phase flowing through said canister thereby coming into intimate contact with and being immobilized at said media.

2. A filtration system in accordance with claim 1 wherein the oil component used in preparing the absorbent composition infused into said media is about 98% by weight of the two reacted components.

3. A filtration system in accordance with claim 1, wherein said fluid-pervious filtration media is in the form of a cartridge which comprises a central core of said infused fluid pervious filtration media which is surrounded and wrapped by a plurality of overlying sheets of further said infused fluid pervious filtration media, the overlying sheets creating void spaces therebetween for trapping and immobilizing at least some of the separated contaminants, and the infused filtration media being subsequently exposed to actinic UV radiation to effect in situ curing of the infused composition.

4. A filtration system in accordance with claim 1, wherein said absorbent composition following thermal reaction is combined with a photoinitiator system before infusing the combination into the fluid-pervious filtration media, and the infused filtration media is subsequently exposed to actinic UV radiation to effect a very rapid in situ curing of the infused composition.

5. A filtration system in accordance with claim 3, wherein said absorbent composition used to treat said media with said wrapped sheets is further treated such that said absorbent composition following thermal reaction is combined with a photoinitiator system before infusing the combination into the said fluid-pervious filtration media, and the infused filtration media is subsequently exposed to actinic UV radiation to effect a very rapid in situ curing of the infused composition.

* * * * *